T. J. ELLISON.
CORN PLANTER.
APPLICATION FILED FEB. 1, 1912.

1,048,139.

Patented Dec. 24, 1912.
2 SHEETS—SHEET 1.

Witnesses
E. Larson

Inventor
Thomas J. Ellison.
By
Attorney

T. J. ELLISON.
CORN PLANTER.
APPLICATION FILED FEB. 1, 1912.
1,048,139.
Patented Dec. 24, 1912.
2 SHEETS—SHEET 2.
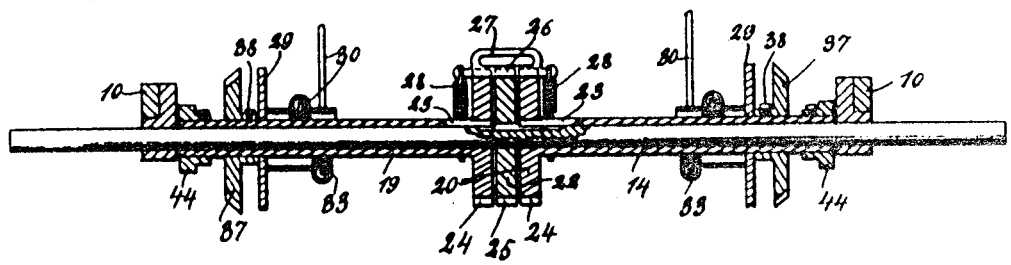
Fig. 3.
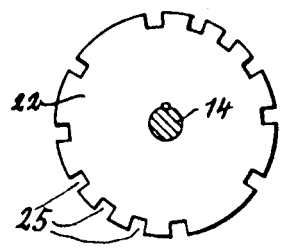
Fig. 4.
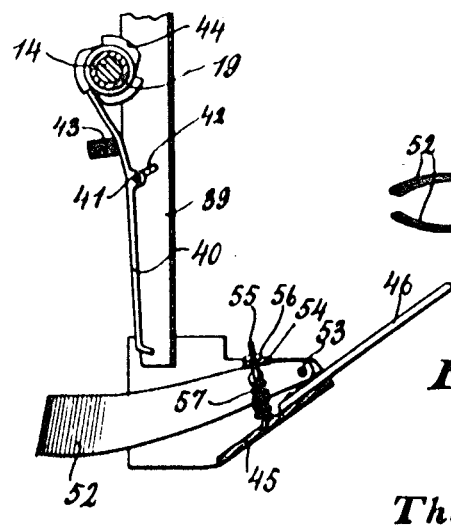
Fig. 6.
Fig. 5.
Witnesses
E. Larson
Inventor
Thomas J. Ellison.
By
Attorneys

UNITED STATES PATENT OFFICE.

THOMAS J. ELLISON, OF TERRILL, KENTUCKY.

CORN-PLANTER.

1,048,139.  Specification of Letters Patent.  Patented Dec. 24, 1912.

Application filed February 1, 1912. Serial No. 674,689.

*To all whom it may concern:*

Be it known that I, THOMAS J. ELLISON, a citizen of the United States, residing at Terrill, in the county of Madison and State of Kentucky, have invented certain new and useful Improvements in Corn-Planters, of which the following is a specification.

This invention relates to corn planters which operate, by mechanism contained within themselves, to drop the seed at regular intervals, after opening the ground therefor, and then cover the seed, and in the meantime make a mark to indicate the position of the row and the hill.

The primary objects of the invention are to simplify the construction, and to drive all the moving parts by one toothed disk or cog wheel attached to the axle of the ground wheels; to render more quick and certain the action of the dropping devices; to easily and accurately adjust the markers; to improve the mounting and adjustment of the marking devices; and to generally improve the construction and operation of the machine.

Other objects and advantages of the invention will be apparent from the detailed description appearing hereinafter, reference being had to the accompanying drawings in which—

Figure 1:
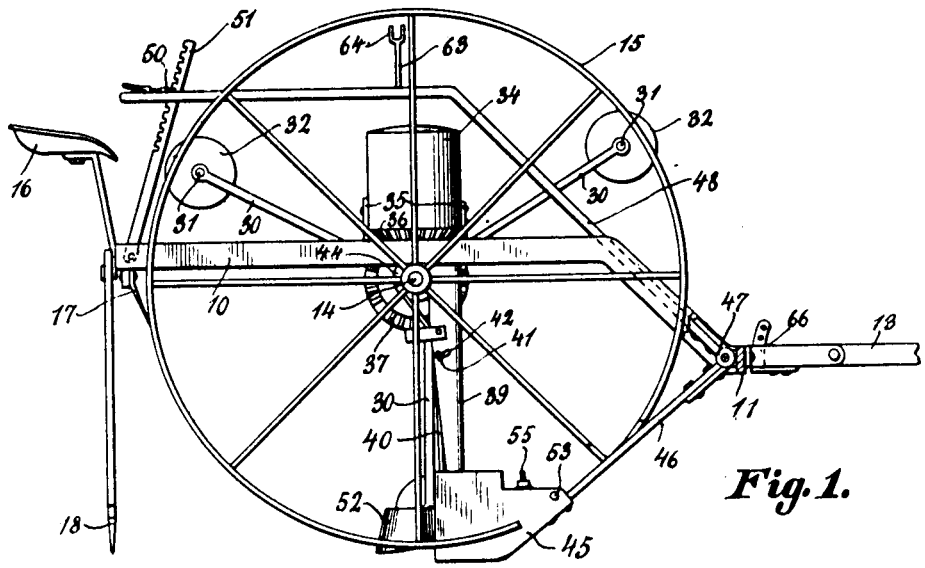
Figure 2:
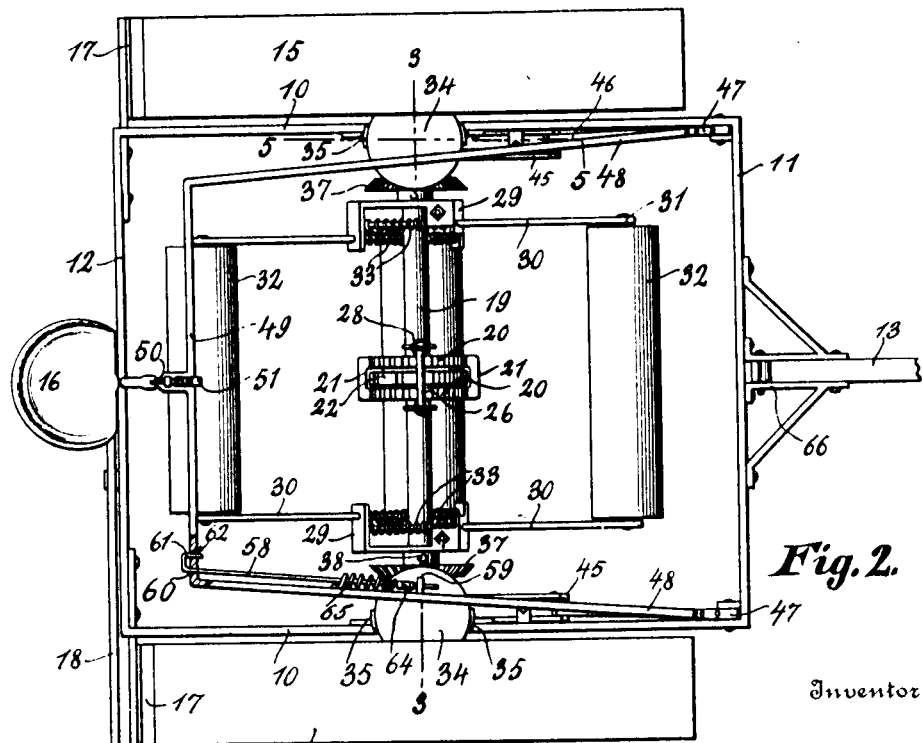

Figure 1 is a side elevation of the machine; Fig. 2 is a plan view thereof; Fig. 3 is a cross-section on the line 3—3 of Fig. 2; Fig. 4 is an elevation of one of the clutch members; Fig. 5 is a section on the line 5—5 of Fig. 2, and Fig. 6 is a plan view of the furrow opener and the covering device carried thereby.

Referring specifically to the drawings, the main frame of the machine comprises side-bars 10 connected at the front and rear by cross-bars 11 and 12, respectively. To the front cross-bar is attached a draft tongue 13, and the side bars carry a transverse axle 14 on which the wheels 15 on which the machine travels are mounted, said axle being located substantially midway between the front and rear ends of the main frame in order that the latter may be properly balanced. The rear cross-bar carries a seat 16 for the driver, a scraper 17 for the wheels 15, and a side marker 18. One of the wheels 15 will be made fast to the axle 14 in any suitable manner so as to operate as the drive wheel of the mechanism to be presently described.

On the axle 14 is loosely mounted a sleeve 19, which is adapted to be locked to said axle by an adjustable clutch connection comprising the following parts: The sleeve 19 is formed midway between its ends with two laterally spaced disks 20 which are connected at their rims as indicated at 21. In the space between the disks 20, the axle 14 carries a disk 22, which is keyed or otherwise made fast to the axle, the sleeve 19 having slots 23 so that the key for securing said disk 22 may be applied. Each disk 20 has notches 24 in its periphery, which are uniformly spaced apart, and the disk 22 has notches 25, which are spaced apart irregularly. The sleeve is locked to the axle by means of a transverse latch-bar 26, which is adapted to be placed in the notches of the disks. The latch-bar has a handle 27 and is connected to the sleeve by coiled springs 28, which serve to hold it in locking position. Upon lifting the latch bar out of the notches, the axle and the sleeve are disconnected. The sleeve 19 has brackets 29 in which are mounted radially extending arms 30 arranged in pairs, the members of the respective pairs being spaced laterally and carrying transverse shafts 31, on which are mounted, so as to turn freely thereon, rollers 32 which serve as markers. The arms 30 are forced outward by springs 33, so that the marker rollers yieldingly engage the ground, and also pass over obstructions without damage, and as said rollers are loose on the shafts 31 they roll over the ground. Three marker rollers are shown, and they are spaced equi-distant apart.

In operation, should the markers not register with the marks made by the same on the previous bout, the operator disengages the latch bar 26, after which the markers may be set into proper position. The seed boxes 34 are secured by brackets 35 to the side-bars 10, and they are provided each with the usual seed plates (not shown) which have a bevel gear 36 in mesh with which is a bevel gear 37 adjustably fastened to the sleeve 19 by a set screw 38.

Each side of the machine carries a seed box as herein described together with a dropping mechanism, so that two rows are planted simultaneously. It will be noted that the seed boxes are located above the axle, in view of which they may be driven from the sleeve 19, and the dimensions of the entire machine are reduced to a minimum. The machine is also rendered more compact, and complicated driving gears are dispensed with. Each seed box carries a seed chute 39 containing a valve 40, which is pivoted intermediate its ends on a bolt 41 mounted in a slot 42 in the side walls of the chute so that the valve may be adjusted. A spring 43 connected to the valve serves to open the same. The valve is closed by a cam 44 mounted on the sleeve 19, into the path of which cam the upper end of the valve extends. When the machine is in operation, the valve is periodically opened to drop the seed. The valve is opened by the spring 43 when that end of the valve which engages the cam slips off the same, and the valve is closed when the cam again engages the same. The lower end of the seed chute extends into a furrow-opener 45 which is carried by a lever arm or drag bar 46 connected by a knuckle 47 to an arm 48 extending at an angle to the lever arm. Both furrow-openers are supported in this manner. The knuckles 47 are pivoted to the front ends of the side bars 10, said bars being downwardly inclined at their front ends, so as to terminate below the plane of the axle 14. The arms 46 are inclined rearward and downward to the furrow-openers to which they are bolted or otherwise secured. The arms 48 are inclined upward and rearward and extend outside the marker arms 30, and the rear ends of said arms 48 are connected by a cross bar 49 carrying a latch 50 which is engageable with a rack-bar 51 pivoted to the rear cross bar 12, said latch and rack-bar serving to lock the supporting arms of the furrow-openers and thus hold the latter in adjusted position. By locating the pivot of the supporting arms of the furrow-openers as shown, the latter will not come in contact with the seed-chutes when they are raised out of operative position, there being ample room between the front of the chutes and the corresponding ends of the furrow-openers to enable the latter to be swung upward without interference by the seed-chutes. It will also be noted that the furrow-openers are set close to the perpendicular center of the wheels 15, they being located slightly in advance thereof, so that the ground may be as loose on one side as on the other to pull through.

Each furrow-opener carries a drag for covering and packing, said drag comprising two laterally spaced plates 52 which are bowed outward at their rear ends, and connected at their forward ends. The drag is located between the side walls of the furrow-opener and its bowed ends project from the rear end thereof. The front end of the drag is pivoted at the corresponding portion of the furrow-opener as indicated at 53, and has a cross bar 54 in which is adjustably mounted a screw stem 55 secured by a nut 56. To one end of the screw stem is connected a spring 57 which is anchored to the furrow-opener, and which spring serves to force the drag downward and yieldingly press it into the ground. The tension of the spring is adjusted by operating the screw stem in an obvious manner. One of the arms 48 carries a lock for holding the marker arms 30 stationary when the machine is not in operation. The lock comprises a rock shaft 58 supported at one of its ends in a bracket 59 carried by the arm 48, and having its other end passing through an aperture 60 in the cross-bar 49 and formed with a return bent end 61 which is adapted to enter a second aperture 62 in said cross-bar, whereby the shaft is locked. The shaft has a lateral arm 63 the extremity of which is forked as indicated at 64. The fork is so located that when the shaft is rocked toward the center of the machine, said fork swings inward and may be slipped over one of the marker arms. Before the shaft can be rocked it will be necessary to pull it in the direction of its length to disengage the bend 61 from the aperture 62. The shaft is operated by a spring 65 coiled around it and connected at one end thereto, the other end of the spring being fastened to the arm 48. The front cross bar 11 carries a clevis 66 to which the draft tongue 13 is connected so that it may be raised or lowered.

I claim:—

1. In a planter, ground wheels, an axle carrying said wheels, a frame supported on the axle and having its forward end downwardly inclined and terminating below the plane of said axle, a seed-box mounted on the frame above the axle, a seed-chute depending from the seed-box and located in front of and in close proximity to the perpendicular center of the wheels, a furrow opener, and a support for the furrow opener comprising an arm carried by and extending rearward and downward from the forward end of the frame.

2. In a planter, ground wheels, an axle carrying said wheels, a frame supported on the axle and having its forward end downwardly inclined and terminating below the plane of said axle, a seed-box mounted on the frame above the axle, a seed-chute depending from the seed-box and located in front of and in close proximity to the perpendicular center of the wheels, a furrow opener, and a support for the furrow opener comprising an arm pivoted to the forward end of the frame and extending rearward and downward therefrom, and means for swinging said arm.

In testimony whereof I affix my signature in presence of two witnesses.

THOMAS J. ELLISON.

Witnesses:
A. M. DAVISON,
S. P. DEATHRAGE.

Copies of this patent may be obtained for five cents each, by addressing the "Commissioner of Patents, Washington, D. C."